UNITED STATES PATENT OFFICE.

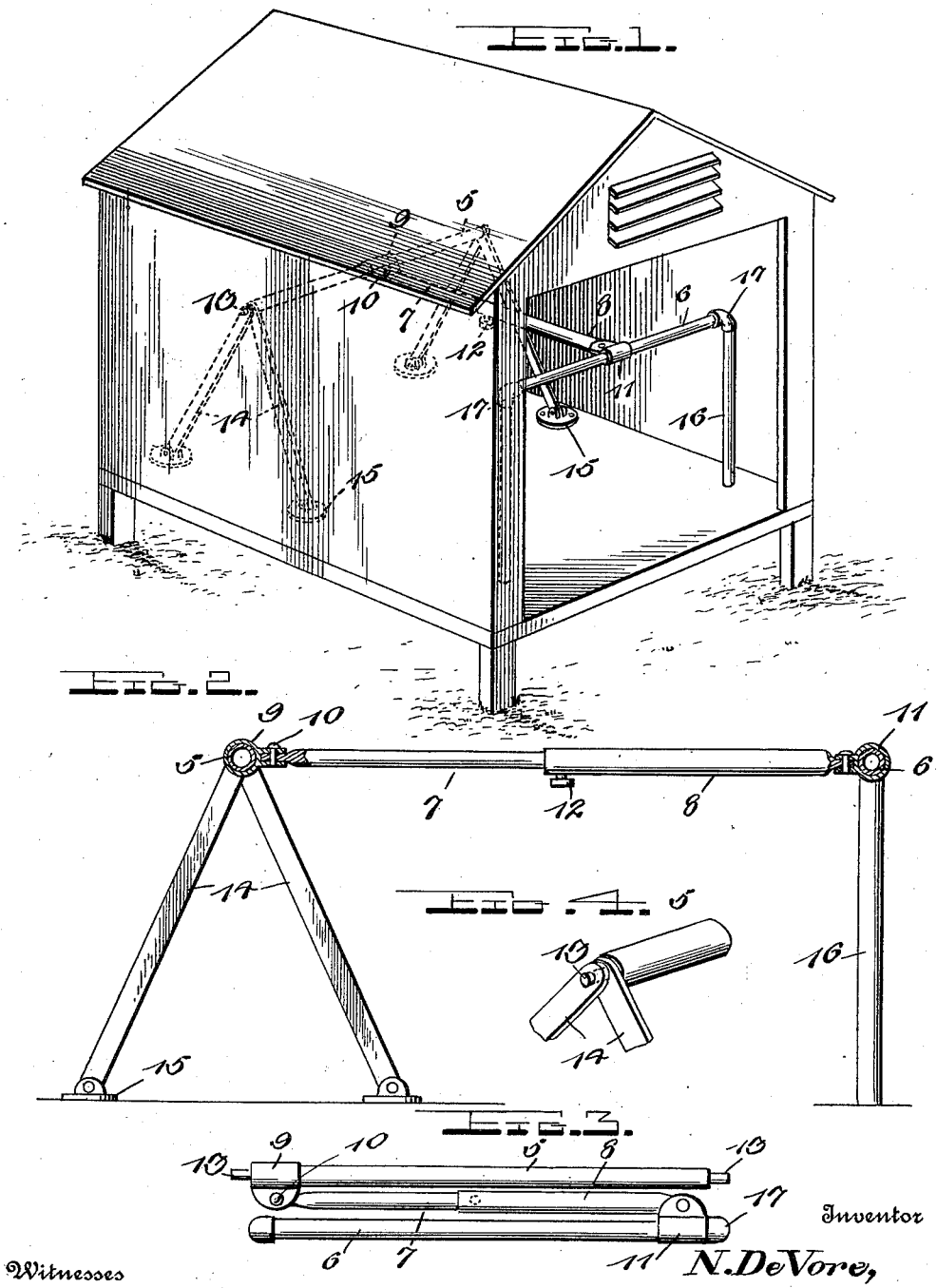

NELLIE DE VORE, OF ROSEVILLE, ILLINOIS.

POULTRY-PERCH.

1,030,980.

Specification of Letters Patent.   Patented July 2, 1912.

Application filed April 5, 1912.   Serial No. 688,738.

*To all whom it may concern:*

Be it known that I, NELLIE DE VORE, a citizen of the United States, residing at Roseville, in the county of Warren and State of Illinois, have invented certain new and useful Improvements in Poultry-Perches, of which the following is a specification, reference being had to the accompanying drawings.

This invention relates to improvements in poultry perches and has for its object to provide a collapsible perch for chickens and other poultry, which is adapted to be arranged in the poultry house, whereby the perch may be easily and quickly removed to facilitate the thorough cleansing of the house.

A further object of the invention is to provide a device of the above character which may be readily set up in a poultry house or removed therefrom, such device including an adjustable extension perch bar and means to rigidly hold said bar in its adjusted position.

Still another object of the invention is to provide a perch for poultry which is constructed entirely of metal, and will therefore be perfectly sanitary in use, and eliminate the breeding of vermin owing to the fact that the entire device can be readily removed whereby the perfect cleansing of the poultry house is assured.

With the above and other objects in view the invention consists in the novel features of construction and in the arrangement and combination of parts hereinafter more fully described, pointed out in the claims, and shown in the accompanying drawings, in which, Figure 1 is a perspective view of a roost or perch for poultry showing the same arranged in the coop or poultry house; Fig. 2 is a central longitudinal section; Fig. 3 is a top plan view showing the device collapsed or folded; and Fig. 4 is an enlarged detail elevation showing the manner of attaching the end supporting members to the floor of the poultry house and to the end of one of the perch bars.

Referring in detail to the drawing, 5 designates the main perch bar and 6 the adjustable bar which is connected to said main bar by means of the telescopically engaged tubes or pipes 7 and 8. The perch bars 5 and 6 are also preferably formed of tubing, though it will be understood that they can also be conveniently made of rods or bars of any desired cross sectional form. The telescoping tube section 7 is pivotally connected at one end to a cuff or sleeve 9, the pivot 10 securing the end of the tube between spaced ears which are laterally projected from the ends of said sleeve. This sleeve is loosely disposed upon the perch bar 5 for longitudinal movement. The other tube section 8 is pivotally connected in a similar manner to the cuff or sleeve 11 which is arranged upon the other of the perch bars 6. A set screw 12 is threaded in the tube section 8 for binding engagement with the tube 7 whereby said tubes may be rigidly secured against relative longitudinal movement to maintain the perch bar 6 in its adjusted position with relation to the bar 5. Upon the opposite ends of the main perch bar 5 the longitudinally projecting studs 13 are arranged, and with said studs the upper ends of the obliquely inclined supporting members 14 are detachably engaged. These supporting members are pivotally mounted at their lower ends between spaced ears or lugs formed upon the plates 15 which are attached to the floor of the poultry house by means of screws or similar fastening devices. These oppositely inclined supporting bars at the ends of the perch bar 5 effectually prevent movement of said bar in either direction and support the same in spaced relation to the floor of the poultry house. To the ends of the adjustable perch bar 6 the pipe sections 16 are connected by means of suitable elbows 17, said pipe sections serving as supporting legs for the adjustable perch bar.

In the actual use of the device when it is desired to remove the same from the poultry house in which the perch is arranged as shown in Fig. 1, the upper ends of the inclined supporting members 14 are forced outwardly off of the studs 13 on the ends of the bar 5 whereupon said oppositely inclined supporting members will move inwardly and downwardly past each other and lie upon the floor of the poultry house. The set screw 12 is now loosened and the pipe section 7 moved into the outer section 8, the perch bars 5 and 6 being forced toward each other. The sleeve 9 is now moved in either direction upon the perch bar 5 and the bar 6 swung inwardly, the tube section 7 moving upon the pivot 10. Thus the perch bars may be disposed closely upon each other and the entire device readily removed through the open door of the poultry house. Thus access may be had to all parts of the interior of the poultry house so that the same can be quickly and thoroughly cleansed. In this manner I aim to reduce to a minimum the breeding of vermin which generally infest the fowls and which is primarily due to an unclean condition of the poultry house.

It will of course be understood that if desired the plates 15 to which the lower ends of the supporting members 14 are pivotally connected may be eliminated, and said supporting members connected at their lower ends by a cross bar so that the supporting members as well as the perch bars may be removed from the poultry house. The arrangement above described is however preferred as the supporting members occupy but little space and do not materially interfere with the proper use of the brushes or other cleansing implements employed in cleaning the floor thereof.

A device constructed in accordance with the present invention is simple, durable, may be manufactured at comparatively small cost and can be easily and quickly set up within the poultry house or removed therefrom.

It will be understood that any desired number of the extensible perch bars 6 can be employed by simply repeating or duplicating the structure above set forth.

The invention is also susceptible of a great many other minor modifications in the form and arrangement of parts without departing from the essential features or sacrificing any of the advantages thereof.

What I claim is:—

1. A poultry perch of the character described, comprising a main perch bar, supporting members detachably connected at their ends to said bar, a second perch bar, and means for adjustably connecting the latter bar to the main perch bar.

2. A poultry perch of the character described, comprising a main perch bar, supporting members detachably connected at their ends to said bar, a second perch bar, said second perch bar being disposed in parallel relation to the first named perch bar, and adjustable tube sections telescopically engaged and connecting said perch bar whereby they may be adjusted toward or from each other.

3. A poultry perch of the character described, comprising a main perch bar, supporting members detachably connected at their ends to said bar, a second perch bar disposed in parallel relation to the first named bar, a tube pivotally supported at one of its ends upon each of said bars, said tubes being telescopically engaged whereby the perch bars may be moved toward or from each other, and a set screw to hold said telescoping tubes against relative movement and secure the perch bars in their adjusted positions.

4. A poultry perch of the character described, comprising a main perch bar, supporting means for said bar arranged at each end thereof, a second perch bar, a sleeve longitudinally slidable upon each of said bars, tubes pivotally connected to said sleeves, said tubes being telescopically engaged whereby the perch bars may be moved toward or from each other, and a set screw to secure said tubes against relative longitudinal movement and hold the perch bars in their adjusted positions.

5. A poultry perch of the character described comprising a main perch bar, inclined supporting members pivotally mounted at one of their ends and detachably engaged at their other ends with the opposite ends of said perch bar, a second perch bar, and means pivotally mounted upon said perch bars and connecting the same whereby the perch bars may be adjusted toward or from each other.

In testimony whereof I hereunto affix my signature in the presence of two witnesses.

NELLIE DE VORE.

Witnesses:
C. F. GODFREY,
S. W. TALIAFERRO.

---

Copies of this patent may be obtained for five cents each, by addressing the "Commissioner of Patents, Washington, D. C."